United States Patent
Yamaguchi et al.

(10) Patent No.: US 9,332,260 B2
(45) Date of Patent: May 3, 2016

(54) CODING DEVICE, DECODING DEVICE, CODING/DECODING SYSTEM, CODING METHOD, AND DECODING METHOD

(75) Inventors: Masayuki Yamaguchi, Osaka (JP); Akihisa Yamada, Osaka (JP); Takashi Nakamae, Nonoichi (JP)

(73) Assignee: Sharp Kabushiki Kaisha, Osaka (JP)

( * ) Notice: Subject to any disclaimer, the term of this patent is extended or adjusted under 35 U.S.C. 154(b) by 350 days.

(21) Appl. No.: 14/128,146

(22) PCT Filed: Jun. 11, 2012

(86) PCT No.: PCT/JP2012/003776
§ 371 (c)(1),
(2), (4) Date: Dec. 20, 2013

(87) PCT Pub. No.: WO2012/176397
PCT Pub. Date: Dec. 27, 2012

(65) Prior Publication Data
US 2014/0192867 A1    Jul. 10, 2014

(30) Foreign Application Priority Data

Jun. 22, 2011  (JP) ................................. 2011-137967

(51) Int. Cl.
| | |
|---|---|
| *H04N 19/00* | (2014.01) |
| *H04N 19/124* | (2014.01) |
| *H04N 19/13* | (2014.01) |
| *H04N 19/90* | (2014.01) |
| *H04N 19/91* | (2014.01) |
| *H04N 19/147* | (2014.01) |
| *H04N 19/137* | (2014.01) |

(Continued)

(52) U.S. Cl.
CPC ....... *H04N 19/00987* (2013.01); *H04N 19/124* (2014.11); *H04N 19/13* (2014.11); *H04N 19/137* (2014.11); *H04N 19/147* (2014.11); *H04N 19/152* (2014.11); *H04N 19/1887* (2014.11); *H04N 19/90* (2014.11)

(58) Field of Classification Search
None
See application file for complete search history.

(56) References Cited

U.S. PATENT DOCUMENTS

| 5,900,946 A | 5/1999 | Kunitake et al. |
|---|---|---|
| 2009/0016627 A1 | 1/2009 | Uetani et al. |

(Continued)

FOREIGN PATENT DOCUMENTS

| JP | 06-022152 A | 1/1994 |
|---|---|---|
| JP | 08-084338 A | 3/1996 |

(Continued)

*Primary Examiner* — Jay Patel
*Assistant Examiner* — Reza Aghevli
(74) *Attorney, Agent, or Firm* — Birch, Stewart, Kolasch & Birch, LLP

(57) ABSTRACT

A coding device and method, a decoding device and method, and a coding/decoding system including the coding device and the decoding device are provided. The coding device includes a predictive value data generator, a predictive error data generator, a variable-length coded data generator that codes the predictive error data to sequentially generate variable-length coded data, in which a code length is variable and equal to or shorter than a set maximum length, and a coding controller. The coding controller sequentially calculates an accumulated value by accumulating a difference between the code length of the variable-length coded data and a target code length, and sequentially sets the maximum code length based on the accumulated value and the number coding time performed by the coder such that the accumulated value is zero or lower.

18 Claims, 12 Drawing Sheets

(51) Int. Cl.
*H04N 19/152* (2014.01)
*H04N 19/169* (2014.01)

(56) References Cited

U.S. PATENT DOCUMENTS

| | | |
|---|---|---|
| 2010/0220936 A1 | 9/2010 | Yamaguchi et al. |
| 2011/0164678 A1 | 7/2011 | Date et al. |

FOREIGN PATENT DOCUMENTS

| | | |
|---|---|---|
| JP | 2006-135370 A | 5/2006 |
| JP | 2007-181051 A | 7/2007 |
| JP | 2009-017505 A | 1/2009 |
| JP | 2010-004514 A | 1/2010 |
| WO | WO 2010/041488 A1 | 4/2010 |

Fig. 3

| r=1 | | | | | | | | | | | | | | | | | |
|---|---|---|---|---|---|---|---|---|---|---|---|---|---|---|---|---|---|
| diq (dip) | 100 | 100 | ... | 100 | 100 | 100 | 100 | 100 | ... | 100 | 100 | 100 | 100 | ... | 100 | 100 |
| di | 0 | 1 | ... | 98 | 99 | 100 | 101 | 102 | ... | 198 | 199 | 200 | 201 | ... | 254 | 255 |
| dq (dp) | −100 | −99 | ... | −2 | −1 | 0 | 1 | 2 | ... | 98 | 99 | 100 | 101 | ... | 154 | 155 |
| n | 199 | 197 | ... | 3 | 1 | 0 | 2 | 4 | ... | 196 | 198 | 200 | 201 | ... | 254 | 255 | dq<0 ⎫ |dq|≤m
dq≥0 ⎭
|dq|>m

Fig. 5 r=1

| dq (dp) | 0 | −1 | 1 | −2 | 2 | ... | −100 | 100 | 101 | 102 | ... | 154 | 155 |
|---|---|---|---|---|---|---|---|---|---|---|---|---|---|
| n | 0 | 1 | 2 | 3 | 4 | ... | 199 | 200 | 201 | 202 | ... | 254 | 255 | r=2

| dq | 0 | −1 | 1 | −2 | 2 | ... | −50 | 50 | 51 | 52 | ... | 77 | 78 |
|---|---|---|---|---|---|---|---|---|---|---|---|---|---|
| n | 0 | 1 | 2 | 3 | 4 | ... | 99 | 100 | 101 | 102 | ... | 127 | 128 | r=4

| dq | 0 | −1 | 1 | −2 | 2 | ... | −25 | 25 | 26 | 27 | ... | 38 | 39 |
|---|---|---|---|---|---|---|---|---|---|---|---|---|---|
| n | 0 | 1 | 2 | 3 | 4 | ... | 49 | 50 | 51 | 52 | ... | 63 | 64 |

Fig. 6

Coding Table 2

| n | Variable-Length Coded Data | Code Length |
|---|---|---|
| 0-3 | 0## | 3 |
| 4-7 | 10## | 4 |
| 8-15 | 110### | 6 |
| 16-31 | 1110#### | 8 |
| 32-63 | 11110##### | 10 |
| 64-127 | 111110###### | 12 |
| 128-255 | 1111110####### | 14 |

Coding Table 1

| n | Variable-Length Coded Data | Code Length |
|---|---|---|
| 0 | 00 | 2 |
| 1-2, 3 | 01# , 100 | 3 |
| 4-5, 6-7 | 101# , 110# | 4 |
| 8-15 | 1110### | 7 |
| 16-31 | 11110#### | 9 |
| 32-63 | 111110##### | 11 |
| 64-127 | 1111110###### | 13 |
| 128-255 | 11111110####### | 15 |

Coding Table 3

| n | Variable-Length Coded Data | Code Length |
|---|---|---|
| 0-15 | 0#### | 5 |
| 16-127 | 10####### | 9 |
| 128-255 | 110####### | 10 |

Fig. 9

| ST | r | | Maximum Code Length of Variable-Length Coded Data |
|---|---|---|---|
| | Y | U,V | |
| 0 | 1 | 1 | 45 |
| 1 | 1 | 2 | 45 |
| 2 | 2 | 4 | 41 |
| 3 | 4 | 8 | 35 |
| 4 | 6 | 12 | 29 |
| 5 | 8 | 16 | 29 |
| 6 | 10 | 20 | 23 |
| 7 | 12 | 24 | 23 |
| 8 | 14 | 28 | 23 |
| 9 | 36 | 40 | 12 |
| 10 | 36 | 74 | 10 |

Fig. 11

|  | r=1 | | | | r=4 | | | |
| --- | --- | --- | --- | --- | --- | --- | --- | --- |
| n | Image 1 | Image 2 | Image 3 | Image 4 | Image 1 | Image 2 | Image 3 | Image 4 |
| 0 | 52 | 25 | 100 | 0 | 79 | 56 | 100 | 0 |
| 1-3 | 16 | 17 | 0 | 0 | 8 | 12 | 0 | 0 |
| 4-7 | 11 | 14 | 0 | 0 | 6 | 11 | 0 | 0 |
| 8-15 | 8 | 12 | 0 | 0 | 4 | 9 | 0 | 0 |
| 16-31 | 6 | 11 | 0 | 0 | 2 | 7 | 0 | 0 |
| 32-63 | 4 | 9 | 0 | 0 | 1 | 5 | 0 | 100 |
| 64-127 | 2 | 7 | 0 | 0 | 0 | 0 | 0 | 0 |
| 128-255 | 1 | 5 | 0 | 100 | 0 | 0 | 0 | 0 |
| Total | 100 | 100 | 100 | 100 | 100 | 100 | 100 | 100 |

Fig. 12

|  | r=1 | | | | r=4 | | | |
| --- | --- | --- | --- | --- | --- | --- | --- | --- |
|  | Image 1 | Image 2 | Image 3 | Image 4 | Image 1 | Image 2 | Image 3 | Image 4 |
| Coding Table 1 | 3.91 | 6.05 | 2 | 15 | 2.63 | 3.73 | 2 | 11 |
| Coding Table 2 | 4.22 | 5.86 | 3 | 14 | 3.35 | 4.08 | 3 | 10 |
| Coding Table 3 | 5.73 | 7.03 | 5 | 10 | 5.12 | 5.48 | 5 | 9 |

Coding Table 4

| n | Variable-Length Coded Data | Code Length |
|---|---|---|
| 0 | 0 | 1 |
| Other than 0 | Code which is a combination of "1" and "Code of n−1" | 1 + (Code Length of "Code of n−1") |

CODING DEVICE, DECODING DEVICE, CODING/DECODING SYSTEM, CODING METHOD, AND DECODING METHOD

CROSS-REFERENCE TO RELATED APPLICATIONS

This application is a National Phase filing under 35 U.S.C. §371 of International Application No. PCT/JP2012/003776 filed on Jun. 11, 2012, and which claims priority to Japanese Patent Application No. 2011-137967 filed on Jun. 22, 2011.

TECHNICAL FIELD

The present invention relates to a coding device and a coding method for coding pixel data, specifically to a coding device and a coding method for coding data stored in a frame memory and the like. The present invention relates to a decoding device and a decoding method for decoding the data coded by the coding device and the coding method. Further, the present invention relates to a coding/decoding system including the coding device and the decoding device.

BACKGROUND ART

In some image processing devices applied to television sets and the like, image data (including data in which a predetermined calculation, such as addition and subtraction, is performed to the image data, the same holds true for the following description) processed in past times is used in processing the image data of a processed target. For example, in such image processing devices, it is necessary to sequentially store the processed image data using a frame memory.

On the other hand, recently an amount of image data that should be processed by the image processing device increases continuously with the rapid progress of high definition and high-speed processing of the image data. Therefore, a storage capacity or a transfer capability necessary for the frame memory also increases continuously, and fabrication of the frame memory that meets the needs becomes harder.

For example, Patent Document 1 proposes a coding device in which the amount of data stored in the frame memory is reduced by performing fixed length coding (a coding method in which a coding length (the number of bits) of coded data is uniform).

However, nowadays there is a demand to further reduce the data amount from the viewpoint of simplification and cost reduction of the frame memory. For example, Patent Documents 2 to 5 propose a coding device in which variable length coding (a coding method in which the code length of the coded data may be different) is adopted, and the data amount may be reduced compared with the fixed length coding.

CITATION LIST

Patent Literature

PTL 1: Japanese Patent Publication Laid-Open No. 2010-4514
PTL 2: Japanese Patent Publication Laid-Open No. 2009-017505
PTL 3: Japanese Patent Publication Laid-Open No. 2006-135370
PTL 4: Japanese Patent Publication Laid-Open No. 08-084338
PTL 5: Japanese Patent Publication Laid-Open No. 06-022152

SUMMARY OF INVENTION

Technical Problem

However, in the variable length coding, because the code length of the coded data is not constant, sometimes the data amount is insufficiently reduced (a minimum compression ratio cannot be achieved). In such cases, there is a problem that the amount of coded data may exceed a storage capacity of the frame memory.

In order to solve the problem, for example, the coding device proposed in Patent Document 2 performs the coding after partially excluding the data in which a predictive error is equal to or more than a predetermined value, thereby reducing the amount of coded data. However, in the coding device, unfortunately sometimes image data is uselessly degraded because the amount of coded data is reduced beyond necessity. Specifically, in the coding device, even for the image data in which the data amount can sufficiently be reduced by the normal variable length coding, the coding is performed after the data is partially excluded in a portion in which the predictive error is increased. Therefore, the portion is degraded.

In the coding device proposed in Patent Document 3, a compression ratio is accurately predicted and set, thereby suppressing the image degradation. However, because it takes a long time to estimate the compression ratio, unfortunately the coding is hardly performed in real time, or the amount of coded data is insufficiently reduced.

In the coding device proposed in Patent Document 4, a high-speed operation of a system can be implemented by performing quantization (compression) at real time based on a transfer amount per unit time, which is determined according to a situation of another device in the system. However, because the quantization is performed irrespective of the image data, sometimes the image data is uselessly degraded.

In the coding device proposed in Patent Document 5, the data amount is restricted in each block when the image data is coded in units of blocks, thereby securely storing the coded data in the memory. However, it is necessary to provide a line memory and the like because the coding is performed in units of blocks, which results in a problem in that only a specific block is degraded.

In view of the foregoing, an object of the present invention is to provide a coding device and a coding method, which can suppress degradation of the pixel data while guaranteeing the target compression ratio. Another object of the present invention is to provide a decoding device and a decoding method, which decode the data coded by the coding device and the coding method. Still another object of the present invention is to provide a coding/decoding system including the coding device and the decoding device.

Solution to Problem

In order to achieve the above object, the present invention provides a coding device including: a predictive value data generator that sequentially generates predictive value data, which is a predictive value of pixel data; a predictive error data generator that sequentially generates predictive error data, which is a difference between the pixel data and the predictive value data; a coder that sequentially codes the predictive error data to sequentially generate variable-length coded data, in which a code length is variable and equal to or shorter than a set maximum code length; and a coding controller that sequentially controls the coder, wherein, while a predetermined number of pieces of the variable-length coded data are generated, the coding controller sequentially calculates an accumulated value by accumulating a difference between the code length of the variable-length coded data generated by the coder and a target code length, and the coding controller sequentially sets the maximum code length based on the accumulated value and the number of coding times, which is the number of times of the coding performed by the coder, such that the accumulated value is equal to or lower than 0 at the time the predetermined number of pieces of variable-length coded data are generated.

In the coding device, preferably the coding controller sets the maximum code length corresponding to a difference between a limit value of the accumulated value and the accumulated value, the limit value being determined according to the number of coding times.

Therefore, the accumulated value can sequentially be controlled in the progress of the coding.

In the coding device, preferably the coding controller sets the maximum code length shorter than the target code length when the accumulated value is larger than the limit value.

Therefore, the accumulated value can securely be decreased when the accumulated value exceeds the limit value.

In the coding device, preferably the limit value decreases in a continuous or stepwise manner with increasing number of coding times, and the limit value becomes 0 at least before the number of coding times reaches the predetermined number.

Therefore, an upper limit (limit value) of the accumulated value is restricted in the progress of the coding, so that the final accumulated value can securely be set to 0.

In the coding device, preferably a domain where the accumulated value and the number of coding times, which are two independent variables, can take values is divided into at least two small domains, the maximum code length is allocated to each of the small domains, and the coding controller sets the maximum code length, which is allocated to each of the small domains determined by the number of coding times and the accumulated value.

Therefore, the maximum code length can be controlled in the stepwise manner.

In the coding device, preferably the plural small domains exist along at least a direction in which the accumulated value increases and decreases, and as the accumulated value of the small domain increases, the maximum code length allocated to the small domain is shorter at the same number of coding times.

Therefore, the allocated maximum code length is shortened with increasing accumulated value. Accordingly, the increase of the accumulated value can effectively be suppressed.

In the coding device, preferably at least one of boundaries of the adjacent small domains has a dead width, and the determined small domain changes when the number of coding times and the accumulated value change beyond the dead width.

Therefore, the change of the allocated maximum code length can have a hysteresis.

In the coding device, preferably the coder includes: a quantizer that sequentially generates quantized predictive error data by quantizing the predictive error data with a predetermined quantized coefficient; and a variable-length coded data generator that sequentially generates the variable-length coded data corresponding to the quantized predictive error data in accordance with a predetermined coding system.

In the coding device, preferably the coding controller selects the quantized coefficient, which is applied to the quantizer, based on the accumulated value and the number of coding times, and the maximum code length is set according to the selected quantized coefficient and the coding system.

Therefore, a range where the code length of the quantized predictive error data can be taken is controlled by selecting the quantized coefficient, which allows the control of the maximum code length.

In the coding device, preferably the pixel data includes plural pieces of component data, the predictive value data generator generates the predictive value data for each piece of the component data, the predictive error data generator generates the predictive error data for each piece of the component data, the quantizer generates the quantized predictive error data for each piece of the component data by quantizing the predictive error data for each piece of the component data with the quantized coefficient for each piece of the component data, the variable-length coded data generator generates the variable-length coded data for each piece of the component data corresponding to the quantized predictive error data for each piece of the component data, the coding controller calculates the accumulated value by accumulating a difference between a total code length of the variable-length coded data for each piece of the component data and the target code length, and the coding controller selects the quantized coefficient for each piece of the component data, which is applied to the quantizer, based on the accumulated value and the number of coding times. Therefore, the quantized coefficient is set for each piece of the component data included in the pixel data, and the code length can be controlled for each piece of the component data. Accordingly, the quantized coefficient can be set according to a characteristic (such as a perception level) of a visual sense of a human.

In the coding device, preferably the coding controller selects the coding system applied to the variable-length coded data generator based on the accumulated value and the number of coding times, and the maximum code length is set according to the selected coding system and the quantized coefficient.

Therefore, the maximum code length of the variable-length coded data can be controlled by selecting the coding system.

In the coding device, preferably the variable-length coded data generator transforms the quantized predictive error data into a coding variable such that as the absolute value of the quantized predictive error data increases, the coding variable increases, the coding variable is 0 when the absolute value of the quantized predictive error data is 0, and the coding variable corresponds one-to-one with the quantized predictive error data, to generate the variable-length coded data such that as the coding variable decreases, a code length of the variable-length coded data is shorter.

Therefore, like the pixel data constituting the natural image data, the coding variable can effectively be decreased for a high probability that the absolute value of the quantized predictive error data becomes 0 or a value close to 0. Accordingly, the code length of the variable-length coded data can effectively be shortened.

In the coding device, preferably the predictive value data generator temporarily and sequentially retains the sequentially-generated predictive value data, and generates new predictive value data using inversely-quantized predictive error data, which is obtained by multiplying the quantized predictive error data generated by the quantizer by the quantized coefficient, and at least one piece of the predictive value data, which is generated with respect to pixel data close to pixel data of a predictive target and previously retained.

Therefore, an error associated with the quantization of the predictive error data is reset, so that the accumulation of the error in the predictive error data can be suppressed. The predictive value data of the pixel data of the predictive target is generated using the predictive value data of the close pixel data, so that the predictive error data can be decreased.

In the coding device, preferably the predictive value data generator temporarily and sequentially retains the sequentially-generated predictive value data, and generates new predictive value data by adding the recently-retained predictive value data to inversely-quantized predictive error data, which is obtained by multiplying the quantized predictive error data generated by the quantizer by the quantized coefficient. Therefore, only one predictive value data should be retained by the predictive value data generator. Accordingly, the circuit scale can be reduced.

In the coding device, preferably, when the coding controller finds that a situation in which the predictive error data becomes 0 is to be generated with a predetermined condition satisfied, the coding controller controls the coder such that the coder generates the variable-length coded data having a one-bit code length when the predictive error data is 0.

Therefore, the compression ratio can effectively be enhanced.

In the coding device, preferably the target code length is equal to or shorter than a length that is obtained by multiplying a code length of the pixel data by a target compression ratio.

Therefore, the target compression ratio can surely be guaranteed.

The present invention also provides a decoding device including: a decoder that decodes the variable-length coded data, which is generated by the coding device, by performing set decoding processing, and sequentially generates decoded predictive error data; a decoded predictive value data generator that sequentially generates decoded predictive value data, which is a predictive value of decoded pixel data; a decoded pixel data generator that sequentially generates the decoded pixel data, which is a sum of the decoded predictive error data and the decoded predictive value data; and a decoding controller that sequentially controls the decoder, wherein, while the predetermined number of pieces of the decoded pixel data are generated, the decoding controller sequentially calculates a decoding accumulated value by accumulating a difference between the code length of the variable-length coded data decoded by the decoder and the target code length used in the coding device, the decoding controller estimates coding processing, which is performed to the variable-length coded data to be decoded by the decoder, based on the decoding accumulated value and the number of decoding times, which is the number of times of the decoding performed by the decoder, and the decoding controller sets the decoder such that decoding processing, which is an inverse processing of the estimated coding processing, is performed to the variable-length coded data.

In the decoding device, preferably the decoding controller sequentially recognizes the variable-length coded data by sequentially detecting a header portion, which constitutes a part or whole of the variable-length coded data, in continuously-input data.

Therefore, the variable-length coded data can be recognized in the continuously-input data by the simple method for detecting the header portion.

In the decoding device, preferably the decoded predictive value data generator temporarily and sequentially retains the decoded pixel data sequentially generated by the decoded pixel data generator, and generates new decoded predictive value data using at least one piece of the decoded pixel data, which is close to the decoded pixel data of a predictive target and previously retained.

Therefore, the decoded pixel data corresponding to the pixel data coded by the coding device can be generated.

In the decoding device, preferably the decoded predictive value data generator temporarily and sequentially retains the decoded pixel data sequentially generated by the decoded pixel data generator, and generates the recently-retained decoded pixel data as new decoded predictive value data.

Therefore, only one decoded pixel data should be retained by the decoded predictive value data generator. Accordingly, the circuit scale can be reduced.

The present invention also provides a coding/decoding system including: the coding device; the decoding device; and a storage device having a predetermined storage capacity, wherein the variable-length coded data generated by the coding device is written in the storage device, and the decoding device generates the decoded pixel data using the variable-length coded data read from the storage device.

The present invention also provides a coding method including: a predictive value data generating step of generating predictive value data, which is a predictive value of pixel data; a predictive error data generating step of generating predictive error data, which is a difference between the pixel data and the predictive value data generated in the predictive value data generating step; a coding step of coding the predictive error data, which is generated in the predictive error data generating step, to generate variable-length coded data, in which a code length is variable and equal to or shorter than a set maximum code length; an accumulated value calculating step of calculating an accumulated value by accumulating a difference between the code length of the variable-length coded data generated in the coding step and a target code length; and a maximum code length setting step of setting the maximum code length in the next coding step based on the accumulated value calculated in the accumulated value calculating step and the number of coding times, which is the number of times of the performed coding step, wherein the predictive value data generating step, the predictive error data generating step, the coding step, the accumulated value calculating step, and the maximum code length setting step are repeatedly performed until a predetermined number of pieces of the variable-length coded data are generated, and the maximum code length is set in the maximum code length setting step such that the accumulated value is equal to or lower than 0 at the time the predetermined number of pieces of variable-length coded data are generated.

The present invention also provides a decoding method including: a decoding step of decoding the variable-length coded data, which is generated by the above-described coding method, by performing set decoding processing, and generating decoded predictive error data; a decoding accumulated value calculating step of calculating a decoding accumulated value by accumulating a difference between the code length of the variable-length coded data decoded in the decoding step and the target code length used in the coding method; a decoding processing setting step of estimating coding processing, which is performed to the variable-length coded data to be decoded in the next decoding step, based on the decoding accumulated value calculated in the decoding accumulated value calculating step and the number of decoding times, which is the number of times of the performed decoding step, and setting decoding processing corresponding to an inverse transformation of the estimated coding processing as the decoding processing in the next decoding step; a decoded predictive value data generating step of generating decoded predictive value data, which is a predictive value of decoded pixel data; and a decoded pixel data generating step of generating the decoded pixel data, which is a sum of the decoded predictive error data generated in the decoding step and the decoded predictive value data generated in the decoded predictive value data generating step, wherein the decoding step, the decoding accumulated value calculating step, the decoding processing setting step, the decoded predictive value data generating step, and the decoded pixel data generating step are repeatedly performed until the predetermined number of pieces of decoded pixel data are generated.

Advantageous Effects of Invention

According to the coding device and the coding method, the maximum code length of the variable-length coded data is sequentially controlled such that the accumulated value becomes finally 0 or less. Therefore, while the target compression ratio is guaranteed, the maximum code length of the variable-length coded data is lengthened when the accumulated value has a margin, so that the degradation of the image data can be suppressed.

BRIEF DESCRIPTION OF DRAWINGS

FIG. 3 is a table illustrating a relationship among image data, quantized predictive error data, and a coding variable for a quantized coefficient of 1 and predictive value data of 100.

FIG. 5 is a table illustrating a relationship between the quantized predictive error data and the coding variable for the quantized coefficient of 1, 2, or 4 and the predictive value data of 100.

FIG. 6 is a table illustrating a specific example of a coding table.

FIG. 9 is a table illustrating an example of a quantized-coefficient selecting method performed by a coding processing selector.

FIG. 11 is a table illustrating the probability of occurrence of the coding variable in various images.

FIG. 12 is a table illustrating an expectation value of each code length when variable-length coded data is generated with respect to pixel data constituting image data in FIG. 11 using coding tables 1 to 3 in FIG. 6.

DESCRIPTION OF EMBODIMENTS (Coding/Decoding System)

Figure 1:
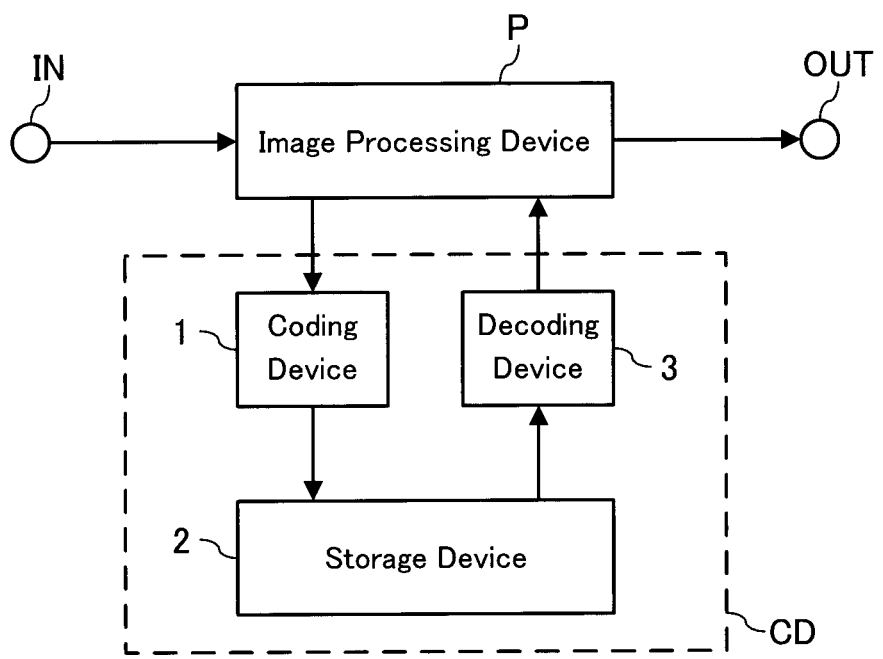
FIG. 1 is a block diagram illustrating a configuration example of an image processing system to which a coding/decoding system according to an embodiment of the present invention is applied.

First a coding/decoding system according to an embodiment of the present invention will be described with reference to the drawing. FIG. 1 is a block diagram illustrating a configuration example of an image processing system to which the coding/decoding system of the embodiment is applied.

As illustrated in FIG. 1, an image processing system PS includes an input terminal IN to which image data is input, an image processing device P that processes the image data input from the input terminal IN and outputs the processed image data, an output terminal OUT that externally outputs the processed image data output from the image processing device P, and a coding/decoding system CD in which data necessary for the image processing device P to perform image processing is stored.

The image processing device P performs processing, such as overshoot processing (also called OS processing or overdrive processing, processing of adjusting a gray level of the image data in order to enhance a response speed of a moving image displayed on a liquid crystal display device and the like), using the image data processed in past times. The image processing device P may perform any processing as long as the image data processed in past times is used.

The coding/decoding system CD includes a coding device 1, a storage device 2, and a decoding device 3. The coding device 1 performs compression coding of data (pixel data) having a predetermined unit (for example, one-frame unit), which is supplied from the image processing device P, with a compression ratio of at least a target compression ratio. The data (variable-length coded data) coded by the coding device 1 is written in the storage device 2. The decoding device 3 inputs data (decoded pixel data), which is obtained by decoding the data (variable-length coded data) read from the storage device 2, to the image processing device P. For example, the storage device 2 is constructed by a device in which the data of the frame memory can temporarily be stored.

In the coding/decoding system CD of the embodiment, the data coded by the coding device 1 is stored in the storage device 2, and the data stored in the storage device 2 is decoded by the decoding device 3, which allows reduction of an amount of data stored in the storage device 2.

The coding device 1 and a coding method and the decoding device 3 and a decoding method of the embodiment, which can be applied to the coding/decoding system CD, will be described below.

(Coding Device and Coding Method)

Figure 2:
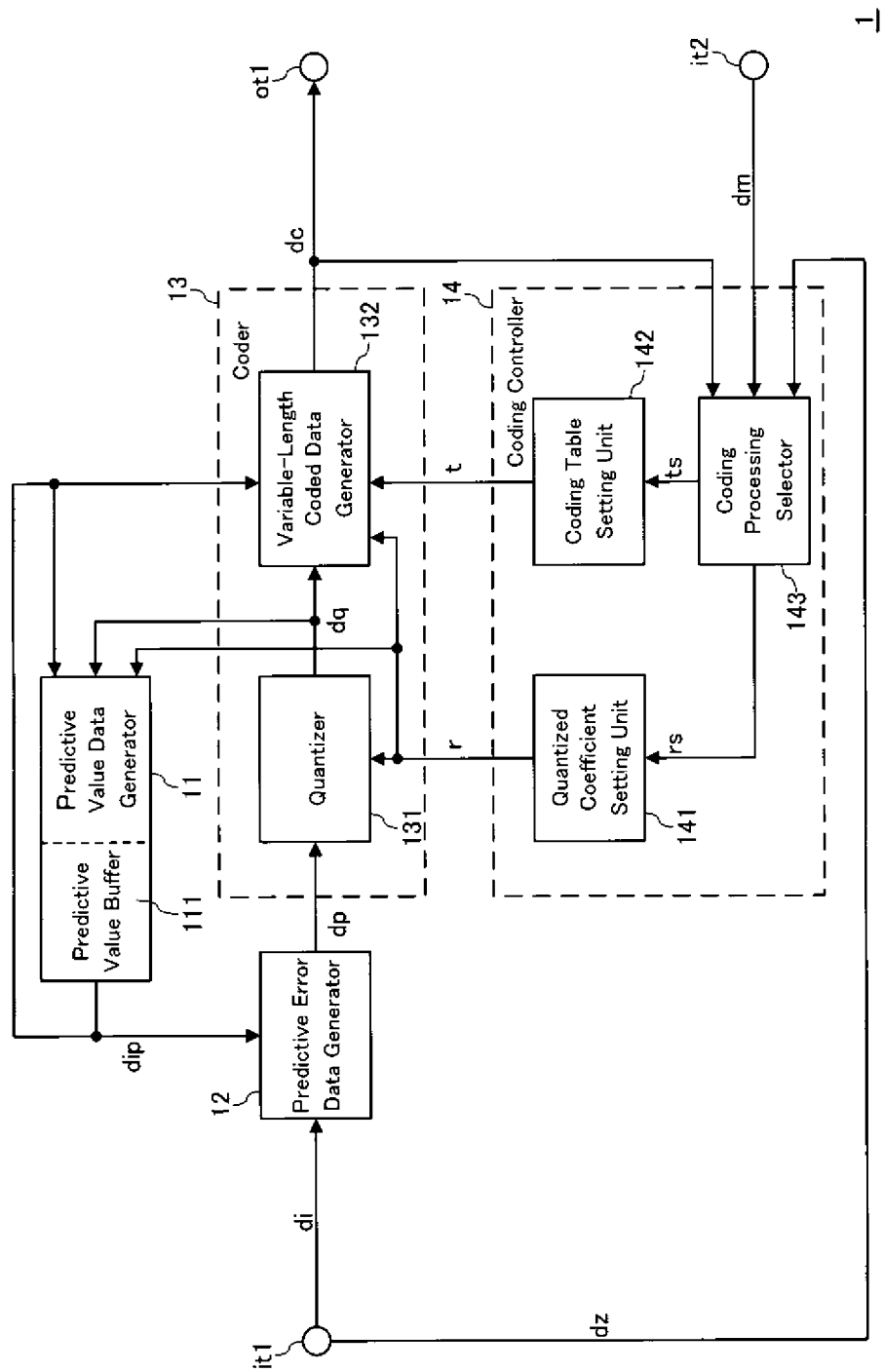
FIG. 2 is a block diagram illustrating a configuration example of a coding device according to an embodiment of the present invention.

The coding device 1 and the coding method of the embodiment will be described below with reference to the drawings. A configuration of the coding device 1 will be described with reference to FIG. 2. FIG. 2 is a block diagram illustrating an example of the configuration of the coding device of the embodiment.

As illustrated in FIG. 2, the coding device 1 includes a first input terminal it1 to which pixel data di and pixel coordinate data dz are sequentially input, a second input terminal it2 to which setting information dm is input, a predictive value data generator 11 that sequentially generates predictive value data dip, which is a predictive value of the pixel data di, a predictive error data generator 12 that sequentially generates predictive error data dp using the pixel data di and the predictive value data dip, a coder 13 that sequentially generates variable-length coded data dc by coding the predictive error data dp, an output terminal ot1 that sequentially outputs the variable-length coded data dc, and a coding controller 14 that sequentially controls the coder 13 based on the variable-length coded data dc, the setting information dm, and the image coordinate data dz.

The predictive value data generator 11 includes a predictive value buffer 111 that can temporarily and sequentially retain the generated predictive value data dip.

The coder 13 includes a quantizer 131 that quantizes the predictive error data dp with a quantized coefficient r to sequentially generate quantized predictive error data dq and a variable-length coded data generator 132 that sequentially generates variable-length coded data dc corresponding to the quantized predictive error data dq.

The coding controller 14 includes a quantized coefficient setting unit 141, a coding table setting unit 142, and a coding processing selector 143. The quantized coefficient setting unit 141 sets the quantized coefficient r. The coding table setting unit 142 sets (corresponds to the selection of the coding system) a coding table t indicating the correspondence relationship between the quantized predictive error data dq and the variable-length coded data dc. The coding processing selector 143 outputs quantized coefficient instruction data rs providing an instruction for the quantized coefficient r to be set and coding table instruction data ts providing an instruction for the coding table t to be set based on the variable-length coded data dc, the setting information dm, and the image coordinate data dz.

A specific operation of the coding device 1 will be described below with reference to the drawings. The case that the coding device 1 codes the full-HD (1920 pixels in the horizontal direction and 1080 pixels in the vertical direction) image data, which has the gray level of 8 bits (256 ways) and is expressed by YUV component data (Y is luminance component data and U and V are color difference component data), for each piece of YUV component data is illustrated for the purpose of the specific description. For the sake of convenience, by way of example, each piece of Y, U, and V component data is previously normalized, and Y, U, and V component data may take integral values of 0 to 255. By way of example, the setting information dm is one that indicates the image size (1920*1080) and the target compression ratio (for example, a target value of the compression ratio, which is set to the whole of a predetermined number of pieces of pixel data, such as all the pieces of pixel data constituting the image data, specifically, 50% or ½ compression).

The pixel data di constituting the image data is sequentially input to the first input terminal it1. The pixel data di may be input in any order. However, when the pieces of pixel data adjacent to each other in the image data are successively input, desirably an absolute value of the predictive error data dp is decreased to shorten a code length of the variable-length coded data dc (Details will be described later). For example, the input order of the pixel data may be the order of raster scan of the image data (the order in which arrayed pieces of pixel data are horizontally continuously scanned from one end to the other end while vertically shifted by one step). For the purpose of specific description, by way of example, the pixel data di is sequentially input to the first input terminal it1 in the order of the raster scan of the image data.

The pixel coordinate data dz indicating a coordinate position of the input pixel data di in the image data is also input to the first input terminal it1. The pixel coordinate data dz may be any information as long as the coding processing selector 143 can recognize the coordinate position of the input pixel data di in the image data. For example, when the pixel data di constituting the image data is input to the first input terminal it1 in the predetermined order (for example, the order of the raster scan), the pixel coordinate data dz may be information in which the number of pieces of pixel data di input to the first input terminal it1 is counted.

As illustrated in the following equation (1), the predictive error data generator 12 generates kth predictive error data $dp_k$ by subtracting kth predictive value data $dip_k$, which is obtained from the predictive value buffer 111 of the predictive value data generator 11, from kth pixel data $di_k$, which is obtained from the first input terminal it1. k is the number of coding times, and k may be natural numbers of 1 to 1920*1080. A method for generating the kth predictive value data $dip_k$ by the predictive value data generator 11 is described later.

$$dp_k = di_k - dip_k \quad (1)$$

Then the coder 13 generates kth variable-length coded data $dc_k$ by coding the kth predictive error data $dp_k$ obtained from the predictive error data generator 12.

As illustrated in the following equation (2), the quantizer 131 quantizes the kth predictive error data $dp_k$ with a kth quantized coefficient $r_k$ to generate kth quantized predictive error data $dq_k$. Specifically, the kth predictive error data $dp_k$ is divided by the kth quantized coefficient $r_k$, and decimal places of the quotient are rounded, thereby generating the kth quantized predictive error data $dq_k$.

The decimal places of the quotient are rounded to generate the kth quantized predictive error data $dq_k$, thereby suppressing an increase of an error near 0 of the kth quantized predictive error data $dq_k$. In the following equation (2), sign (x) expresses a positive or negative sign of x, and [x] expresses an integral portion of x (the nearest whole number to which x is rounded down) (the same holds true in the following description). A method for setting the kth quantized coefficient $r_k$ is described later.

$$dq_k = \mathrm{sign}(dp_k)[(|dp_k| + r_k/2)/r_k] \quad (2)$$

In the equation (2), for the kth quantized coefficient $r_k$ of 1, the kth quantized predictive error data $dq_k$ is equal to the kth predictive error data $dp_k$. On the other hand, for the kth quantized coefficient $r_k$ more than 1, the number of values ([255/r]+2) that are taken by the kth quantized predictive error data $dq_k$ can be lower than the number of values (256) that are taken by the kth predictive error data $dp_k$. However, in this case, possibly the value of the kth quantized predictive error data $dq_k$ becomes identical even if the value of the kth predictive error data $dp_k$ is different (that is, possibly the error is generated).

As illustrated in the following equation (3), the predictive value data generator 11 generates the kth predictive value data $dip_k$ by adding predictive error data $dq_{k-1}*r_{k-1}$, which is obtained by inversely quantizing (k−1)th quantized predictive error data $dq_{k-1}$ obtained from the quantizer 131 with a (k−1)th quantized coefficient r−1, to (k−1)th predictive value data $dip_{k-1}$. Accordingly, the kth predictive value data $dip_k$ is a value close to (k−1)th pixel data $di_{k-1}$ (because ((k−1)th predictive error data $dp_{k-1}$ is quantized and inversely quantized, the kth predictive value data $dip_k$ is not always matched with the (k−1)th pixel data $di_{k-1}$). The predictive value data generator 11 temporarily retains the kth predictive value data $dip_k$ generated from the following equation (3) in the predictive value buffer 111.

$$dip_k = dip_{k-1} + dq_{k-1}*r_{k-1} \quad (3)$$

For the general, natural image data, frequently the pieces of pixel data close each other (particularly adjacent to each other) in the image data have high correlation. Therefore, the predictive value data generator 11 generates the kth predictive value data $dip_k$ as illustrated in the equation (3), which allows the kth predictive error data dp k to be brought close to 0. As described in detail later, in the coding device 1 of the embodiment, the code length of the generated kth variable-length coded data $dc_k$ can be shortened as the kth predictive error data $dp_k$ is brought close to 0.

When generating the kth predictive value data $dip_k$, the predictive value data generator 11 resets the error associated with the quantization of the predictive error data $dp_{k-1}$ by performing the quantization and inverse quantization of the (k−1)th predictive error data $dp_{k-1}$. Therefore, the accumulation of the error associated with the quantization in the kth predictive error data $dp_k$ can be suppressed.

The predictive value data generator 11 may generate the kth predictive value data $dip_k$ by a method different from the equation (3). For example, in the equation (3), (k−a)th predictive value data $dip_{k-a}$ may be used in calculating the kth predictive value data $dip_k$. Specifically, for a=1920, predictive value data $dip_{k-1920}$ for pixel data $di_{k-1920}$ that is vertically adjacent to the kth pixel data $di_k$ in the image data may be used in calculating the kth predictive value data $dip_k$. Specifically, for a=2, predictive value data $dip_{k-2}$ for pixel data $di_{k-2}$ located two before the kth pixel data $di_k$ may be used in calculating the kth predictive value data $dip_k$. For example, an average of plural pieces of (k−a)th predictive value data $di_{k-a}$ (for example, a=1 and 2) may be used in calculating the kth predictive value data $dip_k$. However, it is necessary to provide the line memory in which pixel data $di_{k-a}$ is stored when these methods are adopted, which possibly results in the enlarged circuit scale. Depending on the pixel data scanning method, the predictive value data used may be varied according to the position (for example, whether the pixel data is located in an end portion) of the pixel data to be predicted in the image data.

On the other hand, the variable-length coded data generator 132 transforms the kth quantized predictive error data $dq_k$ obtained by the quantizer 131 into a kth coding variable $n_k$ illustrated in the following equation (4) in order to achieve the simplification of the calculation generating kth variable-length coded data $dc_k$ and the shortening of the code length of the kth variable-length coded data $dc_k$.

In the following equation (4), $m_k$ becomes the smaller value of kth predictive value data $dip_k$ and $255-dip_k$ when the kth quantized coefficient $r_k$ is 1. That is, $m_k = \min(dip_k, 255-dip_k)$. On the other hand, when the kth quantized coefficient $r_k$ is more than 1, $m_k$ in the equation (4) becomes the smaller value of kth quantized predictive value data $diq_k$, which is obtained by substituting the kth predictive value data $dp_k$ in the equation (2) with the kth predictive value data $dip_k$, and $[255/r_k]+1-diq_k$. That is, $m_k = \min(diq_k, [255/r_k]+1-diq_k)$.

In the equation (4), s is a numerical number in which s=0 for $dq_k \geq 0$ and s=1 for $dq_k < 0$. For the quantized coefficient $r_k$ of 1, the kth coding variable $n_k$ becomes successive integral numbers of 0 to 255, which correspond one-on-one with the quantized predictive error data $dq_k$. On the other hand, for the quantized coefficient $r_k$ more than 1, the kth coding variable $n_k$ becomes successive integral numbers of 0 to $[255/r_k]+1$, which correspond one-on-one with the quantized predictive error data $dq_k$.

$$n_k = 2|dq_k|-s, \text{ where } |dq_k| \leq m_k$$

$$n_k = dq_k + m_k, \text{ where } |dq_k| > m_k \quad (4)$$

Figure 4:
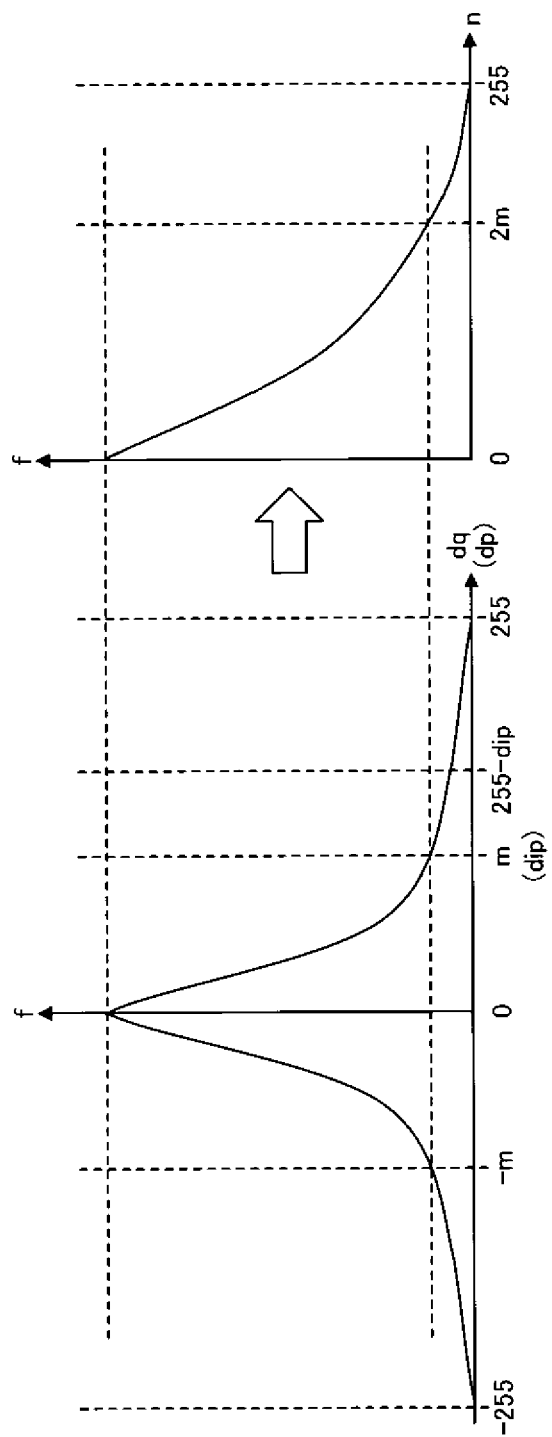
FIG. 4 is a graph illustrating a value of the table in FIG. 3 together with a predicted probability of occurrence.

The coding variable n will be described with reference to the drawings. FIG. 3 is a table illustrating a relationship among the image data, the quantized predictive error data, and the coding variable for the quantized coefficient of 1 and the predictive value data of 100. FIG. 4 is a graph illustrating a value of the table in FIG. 3 together with a predicted probability of occurrence. FIG. 5 is a table illustrating a relationship between the quantized predictive error data and the coding variable for the quantized coefficient of 1, 2, or 4 and the predictive value data of 100. In the graph in FIG. 4, a horizontal axis indicates the predictive error data dp and the coding variable n, and a vertical axis indicates a probability of occurrence f.

As illustrated in FIG. 3, for the quantized coefficient r of 1, the quantized predictive value data diq is equal to the predictive value data dip, and the quantized predictive error data dq is equal to the predictive error data dp. The variable-length coded data generator 132 transforms the quantized predictive error data dq into the coding variable n such that the coding variable n is increased with increasing absolute value of the quantized predictive error data dq, and such that the coding variable n becomes 0 when the absolute value of the quantized predictive error data dq is 0.

As described above, in the general, natural image data, the pieces of pixel data adjacent to each other have the high correlation. Therefore, as illustrated in FIG. 4, a distribution in which the probability of occurrence f increases (for example, a distribution close to a Laplace distribution) is obtained as the absolute value of the quantized predictive error data dq comes close to 0. Accordingly, when the quantized predictive error data dq is transformed into the coding variable n using the equation (4), the probability of occurrence f becomes the maximum for the coding variable n of 0 to obtain the distribution in which the probability of occurrence f decreases monotonously with increasing coding variable n.

As illustrated in FIG. 5, the number of values (integral values) that are taken by the quantized predictive error data dq is decreased with increasing quantized coefficient r. Therefore, the number of values that are taken by the coding variable n, which corresponds one-on-one with the quantized predictive error data dq, is also decreased. The maximum value that can be taken by the coding variable n is decreased with increasing quantized coefficient r.

The variable-length coded data generator 132 generates the kth variable-length coded data $dc_k$ corresponding to the kth coding variable $n_k$ according to a kth coding table $t_k$. In the following description, for the sake of convenience, the variable-length coded data generator 132 uses coding tables 1 to 3 in FIG. 6 by way of example. FIG. 6 is a table illustrating a specific example of the coding table. The method for generating the kth variable-length coded data $dc_k$ using the kth coding table $t_k$ will be described below. A method for selecting the kth coding table $t_k$ is described later.

Each of the coding tables 1 to 3 in FIG. 6 may include a header portion displayed by a predetermined bit and a main body portion displayed by an asterisk. The header portion corresponds to each range where the plural coding variables n are roughly divided, and the main body portion corresponds to the value of the coding variable n within the roughly-divided range.

For example, the coding table 1 in FIG. 6 is selected as the kth coding table $t_k$, and the kth coding variable $n_k$ determined by the variable-length coded data generator 132 is "10." In this case, the variable-length coded data generator 132 recognizes that the kth coding variable $n_k$ belongs to the range of "8 to 15" because the kth coding variable $n_k$ is "10," and that the header portion of the kth variable-length coded data $dc_k$ to be generated is "1110" (main body portion is ###).

Because "10" is the third smallest in the range of "8 to 15," the variable-length coded data generator 132 recognizes that the main body portion "###" is expressed by 3 in a 3-bit binary number, namely, "010." Accordingly, in this case, the variable-length coded data generator 132 generates "1110010" as the kth variable-length coded data $dc_k$. The kth variable-length coded data $dc_k$ is output from the output terminal ot1.

The coding controller 14 controls the operation of the coder 13 by monitoring the sequentially-generated variable-length coded data dc. The method for controlling the coder 13 by the coding controller 14 will be described below.

When the kth variable-length coded data $dc_k$ is generated, the coding processing selector 143 calculates a kth accumulated value $C_k$ as illustrated in the following equation (5). The kth accumulated value $C_k$ is obtained as follows. A code length $B_k$ of the kth variable-length coded data $dc_k$ is added to a (k−1)th accumulated value $C_{k-1}$ and a target code length T is subtracted therefrom. That is, the accumulated value C is obtained by sequentially accumulating a difference between a code length B sequentially generated by the coder 13 and the target code length T. When the target code length T is set to a value (12 bits) in which the code length (8 bits*3=24 bits) of one piece of pixel data is multiplied by a target compression ratio (50%), it can be guaranteed that the coding device 1 achieves the target compression ratio. A first accumulated value $C_1$ is set to a value in which the target code length T is subtracted from a code length $B_1$ of first variable-length coded data $dc_1$.

$$C_k = C_{k-1} + B_k - T \quad (5)$$

Based on the kth accumulated value $C_k$, the coding processing selector 143 sets a kth state variable $ST_k$ as follows. For example, the state variable ST takes integral values of 0 to 10. In coding the (k+1)th predictive error data $dp_k$, the coding processing selector 143 selects the quantized coefficient $r_{k+1}$ and the coding table $t_{k+1}$ according to the kth state variable $ST_k$. In the following equations (6) to (8), h is a vertical size (the number of pixels, for example, 1080) of the image data, and $j_{k+1}$ is a vertical coordinate (0 to h−1, for example, 0 to 1079) of the (k+1)th pixel data $di_{k+1}$ in the image data. It is assumed that $ST_0$ is 0.

Figure 7:
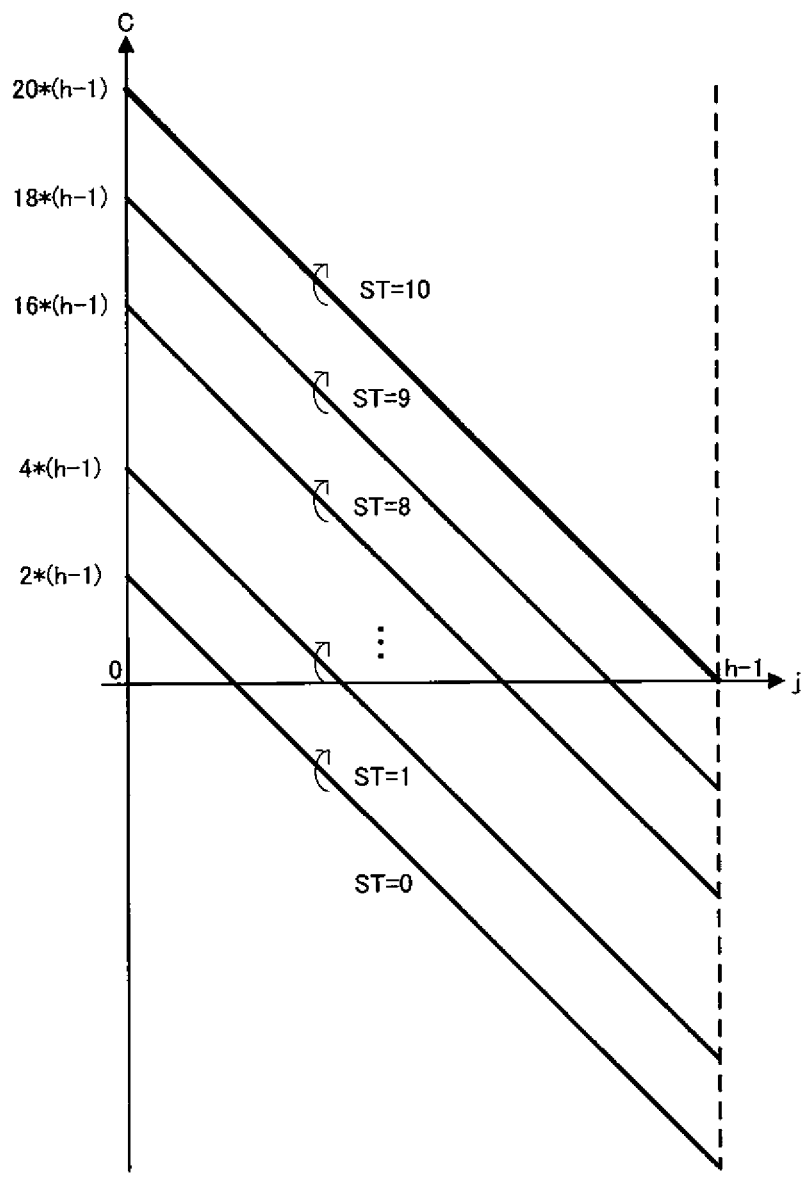
FIG. 7 is a graph illustrating a condition for an increase of a state variable.

When the following equation (6) is satisfied while the (k−1)th state variable $ST_{k-1}$ ranges from 0 to 9, the kth state variable $ST_k$ becomes a value in which the (k−1)th state variable $ST_{k-1}$ is increased by 1. The equation (6) is illustrated in FIG. 7. FIG. 7 is a graph illustrating a condition for the increase of the state variable. In the graph in FIG. 7, a vertical axis indicates the accumulated value C, and a horizontal axis indicates a vertical coordinate j of the pixel data in the image data.

$$C_k > (2 \cdot ST_{k-1} + 2) \cdot (h-1) - 20 \cdot j_{k+1} \quad (6)$$

When the following equation (7) is satisfied while the (k−1)th state variable $ST_{k-1}$ ranges from 1 to 9, the kth state variable $ST_k$ becomes a value in which the (k−1)th state variable $ST_{k-1}$ is decreased by 1.

$$C_k < (2 \cdot ST_{k-1} - 1) \cdot (h-1) - 20 \cdot j_{k+1} \quad (7)$$

Figure 8:
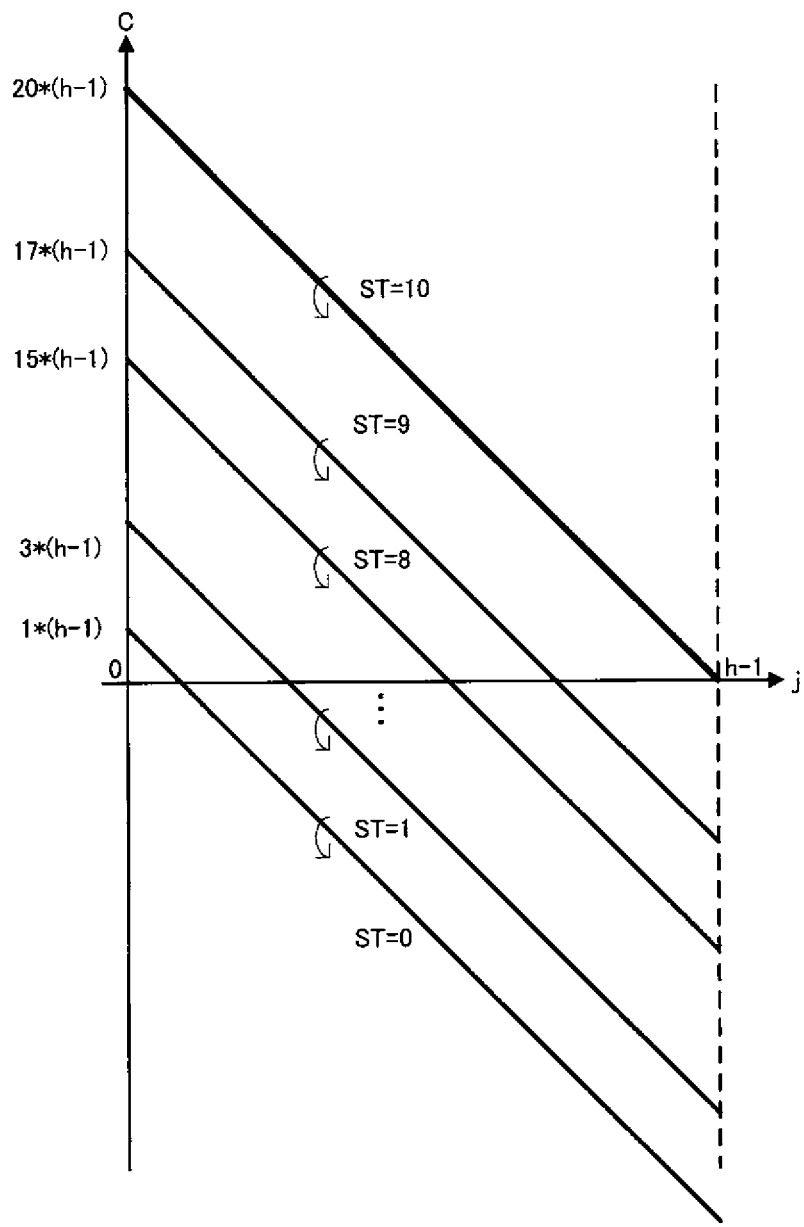
FIG. 8 is a graph illustrating a condition for a decrease of the state variable.

When the following equation (8) is satisfied for the (k−1)th state variable $ST_{k-1}$ of 10, the kth state variable $ST_k$ becomes a value (that is, 9) in which the (k−1)th state variable $ST_{k-1}$ is decreased by 1. The equations (7) and (8) are illustrated in FIG. 8. FIG. 8 is a graph illustrating a condition for the decrease of the state variable. In the graph in FIG. 8, a vertical axis indicates the accumulated value C, and a horizontal axis indicates the vertical coordinate j of the pixel data in the image data.

$$C_k \leq (2 \cdot 9 + 2) \cdot (h-1) - 20 \cdot j_{k+1} \quad (8)$$

The equations (6) to (8) may be interpreted as a boundary of each small domain where the state variables ST become equal to each other. However, the boundary is described by way of example only. Any boundary may be set. In the example, boundary lines expressed in the equations (6) and (7) differ from each other (the boundary has a predetermined dead width) because a hysteresis is provided to the change of the state variable ST. Alternatively, the boundary lines may be aligned.

Specifically, for example, both the boundary line increasing the state variable ST and the boundary line decreasing the state variable ST may be aligned with the boundary line expressed by the equation (6). In the boundary lines expressed by the equations (6) to (8), the vertical coordinate j of the pixel data in the image data is used as the variable. Alternatively, another numerical number, such as the number of coding times k, which indicates a degree of progress of the coding by the coding device 1 may be used as the variable.

Based on the calculated kth state variable $ST_k$, the coding processing selector 143 selects the (k+1)th quantized coefficient $r_{k+1}$ that is used to quantize the (k+1)th predictive error data $dp_{k+1}$. The coding processing selector 143 inputs quantized coefficient instruction data $rs_{k+1}$, which provides an instruction to set the selected (k+1)th quantized coefficient $r_{k+1}$, to the quantized coefficient setting unit 141. Therefore, the quantized coefficient setting unit 141 sets the (k+1)th quantized coefficient $r_{k+1}$, with which the quantizer 131 quantizes the (k+1)th predictive error data $dp_{k+1}$.

An example of the method for selecting the quantized coefficient r by the coding processing selector 143 will be described with reference to the drawing. FIG. 9 is a table illustrating an example of the quantized-coefficient selecting method performed by the coding processing selector. "The maximum code length of the variable-length coded data" in FIG. 9 is illustrated when the variable-length coded data generator 132 uses only the coding table 1 in FIG. 6.

As illustrated in FIG. 9, the coding processing selector 143 increases the quantized coefficient r with increasing state variable ST (with increasing accumulated value C). Therefore, the maximum code length of the variable-length coded data can be shortened because the range of the coding variable n is narrowed (see the equations (2) and (4)).

At this point, as illustrated in FIG. 9, desirably the quantized coefficient is separately set according to the YUV component data. For example, in consideration of the fact that a visual sense of a human has high sensitivity to the luminance component Y and low sensitivity to the color-difference components U and V, the quantized coefficient r set to the color-difference components U and V may be larger than the quantized coefficient r set to the luminance component Y.

Thus, probably the human is insensitive to the image data degradation associated with the increase of the quantized coefficient r (shortening of the code length of the variable-length coded data dc) when the quantized coefficient is set as described above.

In the coding device 1 of the embodiment, when the state variable ST in FIG. 7 becomes the maximum value of 10, the maximum code length (10 bits) of the variable-length coded data dc is set so as to be shorter than the target code length T (12 bits). When the state variable ST is increased from 9 to the maximum value of 10, the accumulated value C (limit value, displayed by a bold line in FIG. 7) at the boundary is set so as to become 0 or less at least at the end (j=1079). Therefore, when the state variable ST becomes the maximum value of 10 with the low compression ratio, the compression ratio higher than the target compression ratio (50%) is implemented, and at least the target compression ratio can finally be achieved.

Figure 10:
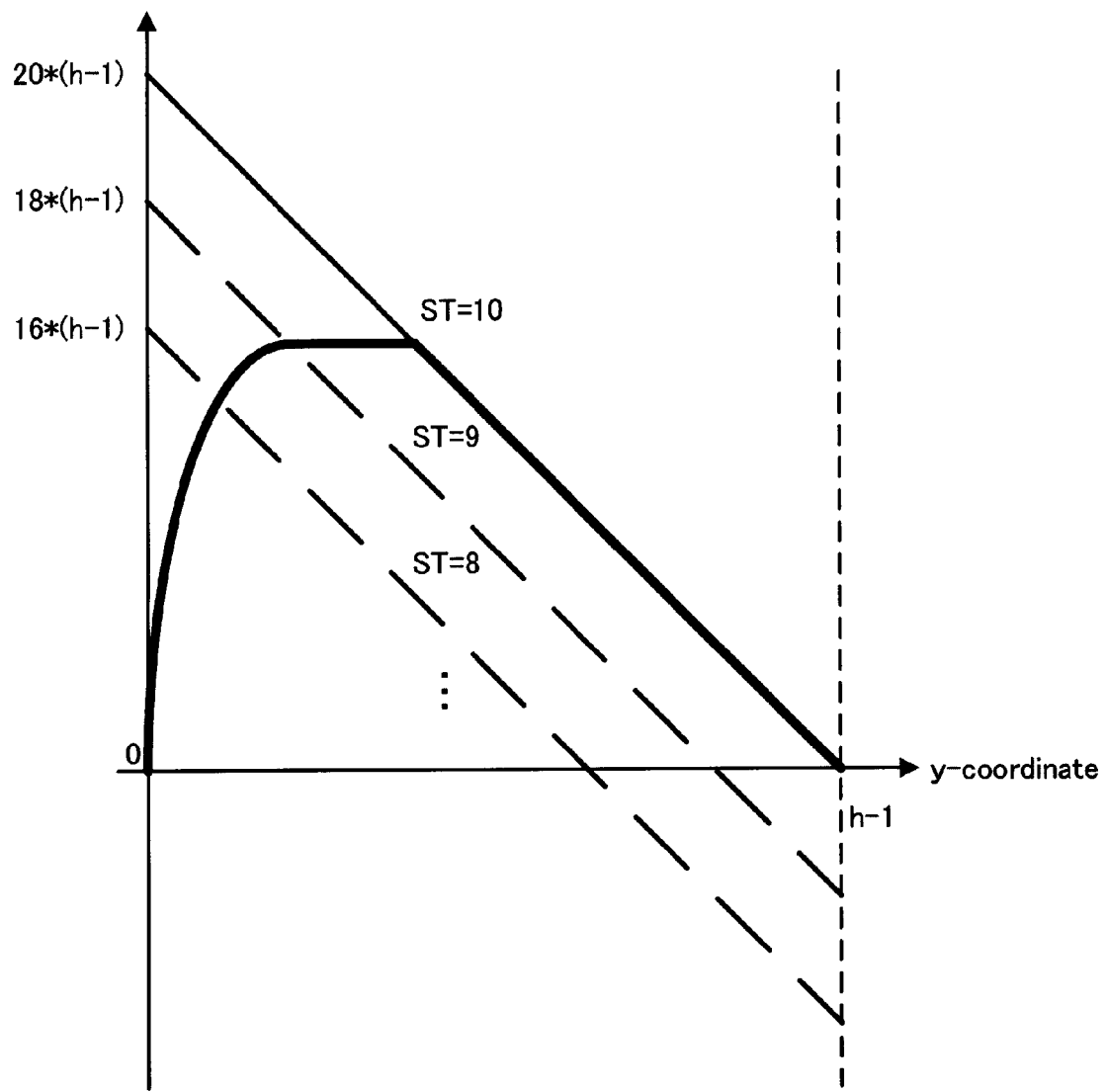
FIG. 10 is a graph illustrating a change of an accumulated value when a total code length of sequentially-generated pieces of variable-length coded data becomes a maximum code length in FIG. 9.

It will specifically be described with reference to the drawing that the coding device 1 of the embodiment can guarantee the target compression ratio. FIG. 10 is a graph illustrating the change of the accumulated value when the total code length of the sequentially-generated pieces of variable-length coded data becomes the maximum code length in FIG. 9. For the sake of convenience, only the boundary line (see the equation (6)) increasing the state variable ST is illustrated in FIG. 10.

As illustrated in FIG. 10, until the state variable ST becomes 9, the accumulated value C is continuously increased with increasing state variable ST, although an increasing rate of the accumulated value C is gradually decreased. Once the state variable ST becomes 9, the accumulated value C does not fluctuate because the maximum code length of the variable-length coded data dc becomes 12 bits as same as the target code length T as illustrated in FIG. 9. At this point, the accumulated value C is still more than 0, and the target compression ratio is not achieved.

The coding of the pixel data di progresses although the accumulated value C does not fluctuate, and the vertical coordinate j of the pixel data di (coding target) in the image data increases. Even if the accumulated value C does not fluctuate, the vertical coordinate j of the pixel data di exceeds a limit value with the progress of the coding of the pixel data di. Therefore, the state variable ST increases to 10.

The maximum code length of the sequentially-generated variable-length coded data dc becomes 10 bits that is shorter than the target code length T. Accordingly, the accumulated value C decreases gradually. In the example, the accumulated value C decreases along the boundary line in which the state variable ST increases to 10. Finally the limit value becomes 0 and the accumulated value C becomes a value of 0 or less, so that the target compression ratio can be guaranteed.

Based on the calculated kth state variable $ST_k$ and accumulated value $C_k$, the coding processing selector 143 selects the (k+1)th coding table $t_{k+1}$ that is used to generate the (k+1)th variable-length coded data$_{k+1}$. The coding processing selector 143 inputs the coding table instruction data $ts_{k+1}$, which provides an instruction to set the selected (k+1)th coding table $t_{k+1}$, to the coding table setting unit 142. Therefore, the coding table setting unit 142 sets the (k+1)th coding table $t_{k+1}$, with which the variable-length coded data generator 132 generates the (k+1)th variable-length coded data $dc_{k+1}$.

An example of the method for selecting the coding table t by the coding processing selector 143 will be described with reference to the drawing. FIG. 11 is a table illustrating a probability of occurrence (%) of the coding variable n in various images. FIG. 12 is a table illustrating an expectation value of each code length when the variable-length coded data is generated with respect to the pixel data constituting the image data in FIG. 11 using the coding tables 1 to 3 in FIG. 6.

An "image" in FIG. 11 may be interpreted as not only the whole image data but also part of the image data. The cases that the images are identical while the quantized coefficients r differ from each other (in the example, 1 and 4) are illustrated in FIGS. 11 and 12. When the quantized coefficient r varies, the range of the coding variable n varies as illustrated in FIG. 5.

As illustrated in FIG. 11, in an image 1, the probability of occurrence is biased in the small coding variable n. On the other hand, in an image 2, the probability of occurrence has a small bias with respect to the small coding variable n, and the probability of occurrence of the large coding variable n is relatively high. That is, in the image 1, the changes of the pieces of pixel data adjacent to each other is relatively small and smooth. In the image 2, the changes of the pieces of pixel data adjacent to each other (the change in brightness or color) is relatively large.

An image 3 is a special image in which the feature of the image 1 is strongly expressed, and an image 4 is a special image in which the feature of the image 2 is strongly expressed. That is, the image 3 is a single (solid) image in which the pieces of pixel data adjacent to each other do not change, and the image 4 is one in which the pieces of pixel data adjacent to each other changes dramatically like a stripe consisting of lines extending in the vertical direction with an interval of one pixel in between. As described above, the quantized coefficient r may fluctuate according to the state variable ST. However, at this point, the quantized coefficient r is fixed to 1 or 4 in order to describe the difference among the coding tables 1 to 3.

When the variable code length data dc is generated with respect to each of the images 1 to 4 in FIG. 11 using the coding tables 1 to 3 in FIG. 6, the expectation value of the code length is illustrated in FIG. 12. The expectation value of the code length in FIG. 12 corresponding to the coding tables 1 to 3 is obtained as follows. The code length of each of the coding tables 1 to 3 in FIG. 6 is multiplied by the probability of occurrence of each of the images 1 to 4 in FIG. 11 for each corresponding coding variable n, and the products are combined.

As illustrated in FIG. 6, the code length of the variable code length data dc, which is obtained using the coding table 1, is lower than that obtained using the coding table 2 when the coding variable n is small, and the code length is more than that obtained using the coding table 2 when the coding variable n is large. Therefore, as illustrated in FIG. 12, for the image 1, the expectation value of the code length of the variable code length data dc, which is obtained using the coding table 1, is lower than the expectation value of the code length of the variable code length data dc, which is obtained using the coding table 2. That is, the use of the coding table 1 is higher than the use of the coding table 2 in the compression ratio. The same holds true for the image 3.

On the other hand, for the image 2, adversely the expectation value of the code length of the variable code length data dc, which is obtained using the coding table 2, is lower than the expectation value of the code length of the variable code length data dc, which is obtained using the coding table 1. That is, the use of the coding table 2 is higher than the use of the coding table 1 in the compression ratio. The same holds true for the image 4.

For example, based on the state variable ST and the accumulated value C, the coding processing selector 143 can recognize a tendency of the probability of occurrence of the coding variable n, and properly select the coding table with which the code length of the variable-length coded data dc is expected to be shortened. Thus, the coding processing selector 143 selects the coding table to shorten the code length of the variable-length coded data dc, which allows the enhancement of the compression ratio.

From the viewpoint of guaranteeing the target compression ratio, desirably the coding processing selector 143 selects the coding table 3, which may shorten the code length of the variable-length coded data dc, when the coding variable n increases particularly (for example, the case that the image 4 is coded). For example, the coding processing selector 143 selects the coding table 3 when the state variable ST or the accumulated value C is more than a predetermined value. Therefore, the compression ratio can effectively be enhanced.

Similarly the coding processing selector 143 may select the coding tables 1 to 3 according to the state variable ST or the accumulated value C.

As described above, in the coding device 1 and coding method of the embodiment, the maximum code length of the variable-length coded data dc is sequentially controlled such that the accumulated value C is finally equal to or lower than 0. Therefore, while the target compression ratio is guaranteed, the maximum code length of the variable-length coded data dc can be lengthened when the accumulated value C has a margin, so that the degradation of the image data can be suppressed.

(Decoding Device and Decoding Method)

Figures 13, 14:
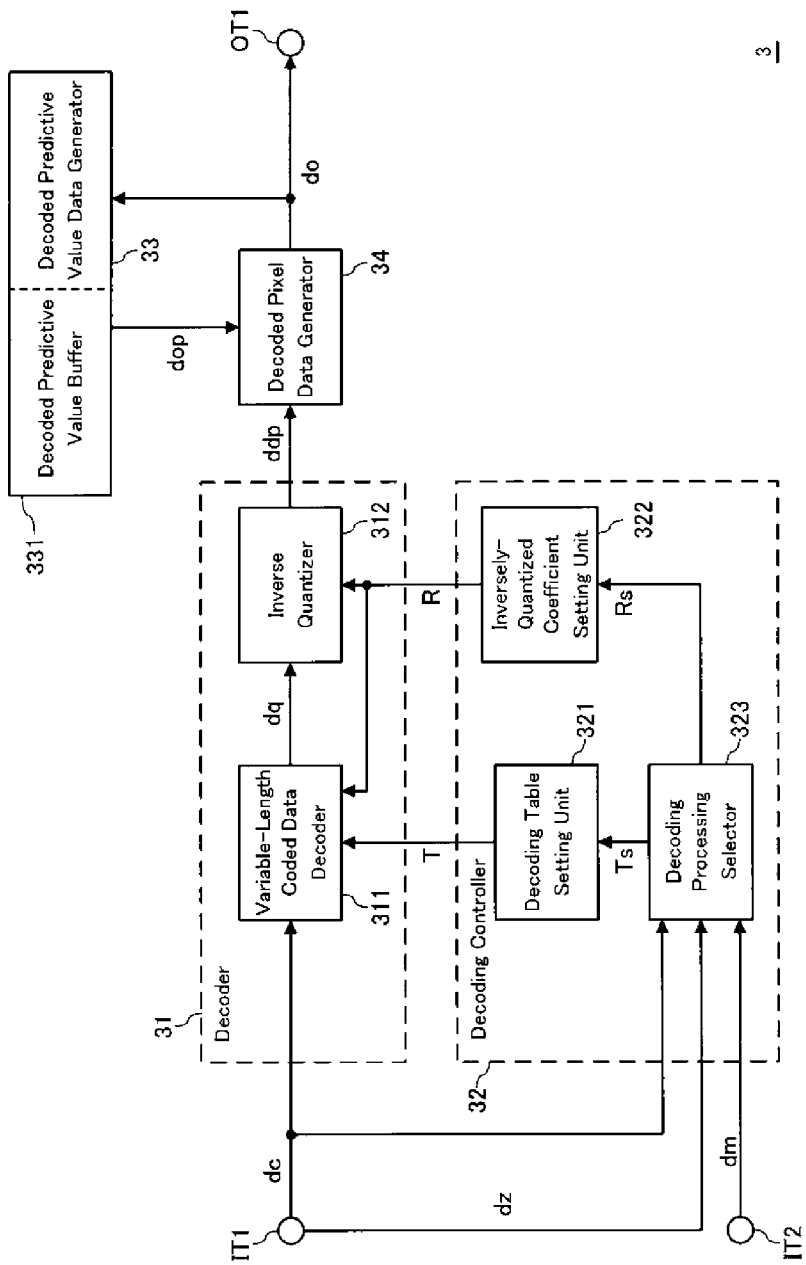
FIG. 13 is a block diagram illustrating an example of a configuration of a decoding device according to an embodiment of the present invention.
FIG. 14 is a table illustrating another example of the coding table.

The decoding device 3 and the decoding method of the embodiment will be described below with reference to the drawings. First a configuration of the decoding device 3 will be described with reference to FIG. 13. FIG. 13 is a block diagram illustrating an example of the configuration of the decoding device of the embodiment. In FIG. 13, the same component as the coding device 1 in FIG. 2 is designated by the same numeral, and the detailed description is omitted. For the purpose of specific description, it is assumed that various settings described in the coding device 1 are also applied in the following description.

As illustrated in FIG. 13, the decoding device 3 includes a first input terminal IT1 to which the variable-length coded data dc and the pixel coordinate data dz are sequentially input, a second input terminal IT2 to which the setting information dm is input, a decoder 31 that sequentially generates decoding predictive pixel data ddp by sequentially decoding the variable-length coded data, a decoding controller 32 that sequentially controls the decoder 31 based on the variable-length coded data dc, the setting information dm, and the image coordinate data dz, a decoded predictive value data generator 33 that sequentially generates decoded predictive value data dop, which is a predictive value of decoded pixel data do, a decoded pixel data generator 34 that sequentially generates the decoded pixel data do using the decoded predictive error data ddp and the decoded predictive value data dop, and an output terminal OT1 that sequentially outputs the decoded pixel data do.

The decoded predictive value data generator 33 includes a decoded predictive value buffer 331 that can temporarily and sequentially retain the generated decoded predictive value data dop.

The decoder 31 includes a variable-length coded data decoder 311 that sequentially generates quantized predictive error data dq corresponding to the variable-length coded data dc and an inverse quantizer 312 that sequentially generates the decoded predictive error data ddp by inversely quantizing the quantized predictive error data dq with an inversely-quantized coefficient R.

The decoding controller 32 includes a decoding table setting unit 321, an inversely-quantized coefficient setting unit 322, and a decoding processing selector 323. The decoding table setting unit 321 sets a decoding table T indicating a correspondence relationship between the variable-length coded data dc and the quantized predictive error data dq. The inversely-quantized coefficient setting unit 322 sets the inversely-quantized coefficient R. The decoding processing selector 323 outputs decoding table instruction data Ts providing an instruction for the decoding table T to be set and inversely-quantized coefficient instruction data Rs providing an instruction for the inversely-quantized coefficient R to be set, based on the variable-length coded data dc, the setting information dm, and the image coordinate data dz.

A specific operation of the decoding device 3 will be described below with reference to the drawings. First the variable-length coded data dc is sequentially input to the first input terminal IT1. Desirably the input order of the variable-length coded data dc is identical to the order in which the variable-length coded data dc is output from the coding device 1. The pixel coordinate data dz is also sequentially input to the first input terminal IT1.

The decoding processing selector 323 selects the decoding table T, which indicates the same correspondence relationship as the coding table t, and the inversely-quantized coefficient R, which is equal to the quantized coefficient r, by the same method as the coding processing selector 143 (the selecting method based on the accumulated value C and the state variable ST). The decoding processing selector 323 outputs the decoding table instruction data Ts, which provides the instruction to set the selected decoding table T, to the decoding table setting unit 321, and the decoding processing selector 323 outputs the inversely-quantized coefficient instruction data Rs, which provides the instruction to set the selected inversely-quantized coefficient R, to the inversely-quantized coefficient setting unit 322.

Based on the decoding table T set by the decoding table setting unit 321, the variable-length coded data decoder 311 specifies the header portion in the input data, thereby specifying uth variable-length coded data $dc_u$ and determining uth coding variable $n_u$. u is the number of decoding times, and is natural numbers of 1 to 1920*1080, similar to the number of coding times of k.

Specifically, the decoding table T indicating the same correspondence relationship as the coding table 1 in FIG. 6 is set, and the inversely-quantized coefficient R is set to 1. At this point, when "1110" is detected in the data sequentially input to the first input terminal IT1, it is found that 7 bits of "1110###" is the variable-length coded data dc. For example, when "###" subsequent to the header portion is "010," it can be determined that the coding variable n is the third smallest "10" in the range of "8 to 15."

Then the variable-length coded data decoder 311 generates uth quantized predictive error data $dq_u$ by performing the inverse operation to that of the variable-length coded data generator 132 (that is, the inverse transformation of the equation (4)) to the specified uth coding variable $n_u$.

As illustrated in the following equation (9), the inverse quantizer 312 generates uth decoded predictive error data $ddp_u$ by inversely quantizing the uth quantized predictive error data $dq_u$ with a uth inversely-quantized coefficient $R_u$. Specifically, the absolute value of the uth quantized predictive error data $dq_u$ is multiplied by the uth inversely-quantized coefficient $R_u$, 1 is subtracted from the product, and the obtained value is provided with the sign of the uth quantized predictive error data $dq_u$, thereby generating the uth decoded predictive error data $ddp_u$.

$$ddp_u = \operatorname{sign}(dq_u)(|dq_u| * R_u - 1) \qquad (9)$$

As illustrated in the following equation (10), the decoded predictive value data generator 33 directly sets (u−1)th decoded pixel data $do_{u-1}$ to uth decoded predictive value data $dop_u$. The (u−1)th decoded pixel data $do_{u-1}$ is temporarily retained in the decoded predictive value buffer 311. As with the calculation of the predictive value data dip in the coding device 1, the decoded predictive value data generator 33 may generate the uth decoded predictive value data $dop_u$ by a method different from the equation (10). However, desirably the decoded predictive value data generator 33 adopts the method corresponding to that in the predictive value data generator 11. Specifically, for example, when the predictive value data generator 11 uses the (k−a)th predictive value data $dip_{k-a}$ in calculating the kth predictive value data $dip_k$, desirably the decoded predictive value data generator 33 sets (u−a)th decoded pixel data $do_{u-a}$ to the uth decoded predictive value data $dop_u$.

$$dop_u = do_{u-1} \quad (10)$$

As illustrated in the following equation (11), the decoded pixel data generator 34 calculates uth decoded pixel data $do_u$ by adding the uth decoded predictive value data $dop_u$ to the uth decoded predictive error data $ddp_u$.

$$do_u = ddp_u + dop_u \quad (11)$$

As described above, in the decoding device 3 and the decoding method, the decoded pixel data do can be generated by decoding the variable-length coded data dc, which is coded by the coding device 1 and the coding method.

(Modification)

<1> A coding table 4 illustrated in FIG. 14 may be included in the coding table that can be selected by the coding processing selector 143 of the coding device 1. FIG. 14 is a table illustrating another example of the coding table.

When the variable-length coded data generator 132 uses the coding table in FIG. 14, 1-bit variable-length coded data dc that is of 0 is generated for the coding variable n of 0. On the other hand, when the coding variable n is not 0, 1+(code length of "code of n−1")-bit variable-length coded data dc in which "1" and "code of n−1" are combined is generated. The "code of n−1" may be a code that is obtained using one of the coding tables 1 to 3 in FIG. 6.

For the coding variable n of 0, the use of the coding table 4 can effectively enhance the compression ratio. Therefore, when the coding variables n are continued at least the predetermined number of times (for example, twice), desirably the coding processing selector 143 selects the coding table 4.

<2> The variable length data generator 132 of the coding device 1 may perform the quantization in addition to (or instead of) the quantization of the quantizer 131. Specifically, for example, when the coding table 1 is selected for the coding variable n of 10, the variable-length coded data dc in which the header portion "1110" and the main body portion "010" are combined is generated in the above example. Alternatively, the 3-bit value (8 ways) that can be taken by the main body portion is further quantized with 2 to generate the 2-bit (4 ways) main body portion. In this case, the variable-length coded data dc in which the header portion "1110" and the main body portion "01" are combined is generated.

Therefore, the code length of the variable-length coded data dc can efficiently be shortened. The variable length data generator 132 may perform the above quantization only in the particular case that the accumulated value C or the state variable ST becomes more than a predetermined value, or the variable length data generator 132 may always perform the above quantization.

<3> In the embodiment, the coding processing selector 143 of the coding device 1 controls the code length (compression ratio) of the variable-length coded data dc by selecting both the quantized coefficient r and the coding table t. Alternatively, only the quantized coefficient r may be selected while the coding table t is fixed. However, when the coding processing selector 143 is configured to select the coding table t, desirably the image degradation is suppressed while the compression ratio is effectively enhanced. Instead of selecting the coding table t, the coding processing selector 143 may select a calculation expression indicating the coding system.

<4> In the embodiment, the coding processing selector 143 of the coding device 1 selects the quantized coefficient r and the coding table t based on the state variable ST. Alternatively, based on the accumulated value C and the coordinate j (or the accumulated value C and the number of coding times k), the quantized coefficient r and the coding table t may directly be selected without calculating the state variable ST.

In the equations (6) to (8) and FIGS. 7 and 8, in the boundary lines provided at equal intervals, the accumulated value is decreased with increasing coordinate j. The boundary lines may be set in any way. For example, the boundary lines may be set such that the accumulated value is increased when the coordinate j is located near an intermediate coordinate (for example, 539 that is of a half of 1079) in the vertical direction of the image data, or the boundary lines may not be provided at equal intervals.

<5> In the embodiment, the pixel data constituting the image data includes each of the components YUV. Alternatively, the pixel data may include pieces of component data of R (red), G (green), and B (blue), or the pixel data may include other pieces of component data. The kinds of the pieces of component data included in the pixel data is not limited to the three kinds, but may be four kinds or more, or may be two kinds or less. YUV and RGB can mutually be transformed using the following equations (11) and (12).

$$Y = [(R+2G+B)/4]$$

$$U = B-G$$

$$V = R-G \quad (11)$$

$$G = Y - [(U+V)/4]$$

$$R = V + G$$

$$B = U + G \quad (12)$$

<6> In the embodiment, the coding device 1 performs the coding, in which the compression ratio is guaranteed, to all the pieces (1920*1080) of pixel data constituting the image data. Alternatively, the coding may be performed to the predetermined number of pieces of pixel data except the pieces (1920*1080) of pixel data. Specifically, for example, the coding device 1 may perform the coding, in which the compression ratio is guaranteed, to the pieces of pixel data of one line in the horizontal direction of the image data or an upper half or a lower half of all the pieces of pixel data constituting the image data.

INDUSTRIAL APPLICABILITY

The present invention can be applied to the coding device and the coding method, which code the pixel data constituting the image data when the image data reproduced by the television set and the like is stored in the frame memory and the like. The present invention can also be applied to the decoding device and the decoding method, which decode the coded pixel data read from the frame memory and the like. Additionally, the present invention can be applied to the coding/decoding system including the coding device and the decoding device.

REFERENCE SIGNS LIST

1 CODING DEVICE
11 PREDICTIVE VALUE DATA GENERATOR
111 PREDICTIVE VALUE BUFFER
12 PREDICTIVE VALUE ERROR DATA GENERATOR
13 CODER
131 QUANTIZER

132 VARIABLE-LENGTH CODED DATA GENERATOR
14 CODING CONTROLLER
141 QUANTIZED COEFFICIENT SETTING UNIT
142 CODING TABLE SETTING UNIT
143 CODING PROCESSING SELECTOR
2 STORAGE DEVICE
3 DECODING DEVICE
31 DECODER
311 VARIABLE-LENGTH CODED DATA DECODER
312 INVERSE QUANTIZER
32 DECODING CONTROLLER
321 DECODING TABLE SETTING UNIT
322 INVERSELY-QUANTIZED COEFFICIENT SETTING UNIT
323 DECODING PROCESSING SELECTOR
33 DECODED PREDICTIVE VALUE DATA GENERATOR
331 DECODED PREDICTIVE VALUE BUFFER
34 DECODED PIXEL DATA GENERATOR

The invention claimed is:

1. A coding device comprising:
a predictive value data generator that sequentially generates predictive value data, which is a predictive value of pixel data;
a predictive error data generator that sequentially generates predictive error data, which is a difference between the pixel data and the predictive value data;
a coder that sequentially codes the predictive error data to sequentially generate variable-length coded data, in which a code length is variable and equal to or shorter than a set maximum code length; and
a coding controller that sequentially controls the coder, wherein,
while a predetermined number of pieces of the variable-length coded data are generated, the coding controller sequentially calculates an accumulated value by accumulating a difference between the code length of the variable-length coded data generated by the coder and a target code length,
the coding controller sequentially sets the maximum code length corresponding to a difference between a limit value of the accumulated value and the accumulated value, the limit value being determined according to the number of coding times, which is the number of times of coding performed by the coder, such that the accumulated value is equal to or lower than 0 at the time the predetermined number of pieces of variable-length coded data are generated, and
the limit value decreases in a continuous or stepwise manner as the number of coding times increases, and the limit value becomes 0 at least before the number of coding times reaches the predetermined number.

2. The coding device according to claim 1, wherein
a domain where the accumulated value and the number of coding times, which are independent variables, can take values is divided into at least two small domains, the maximum code length is allocated to each of the small domains, and the coding controller sets the maximum code length, which is allocated to each of the small domains determined by the number of coding times and the accumulated value.

3. The coding device according to claim 2, wherein
at least one of boundaries of the adjacent small domains has a dead width, and the determined small domain changes when the number of coding times and the accumulated value change beyond the dead width.

4. The coding device according to claim 1, wherein
the coder includes:
a quantizer that sequentially generates quantized predictive error data by quantizing the predictive error data with a predetermined quantized coefficient; and
a variable-length coded data generator that sequentially generates the variable-length coded data corresponding to the quantized predictive error data in accordance with a predetermined coding system.

5. The coding device according to claim 4, wherein
the coding controller selects the quantized coefficient, which is applied to the quantizer, based on the accumulated value and the number of coding times, and the maximum code length is set according to the selected quantized coefficient and the coding system.

6. The coding device according to claim 4, wherein
the coding controller selects the coding system applied to the variable-length coded data generator based on the accumulated value and the number of coding times, and the maximum code length is set according to the selected coding system and the quantized coefficient.

7. The coding device according to claim 4, wherein
the variable-length coded data generator transforms the quantized predictive error data into a coding variable such that as the absolute value of the quantized predictive error data increases, the coding variable increases, the coding variable is 0 when the absolute value of the quantized predictive error data is 0, and the coding variable corresponds one-to-one with the quantized predictive error data, to generate the variable-length coded data such that as the coding variable decreases, a code length of the variable-length coded data is shorter.

8. The coding device according to claim 4, wherein
the predictive value data generator temporarily and sequentially retains the sequentially-generated predictive value data, and generates new predictive value data using inversely-quantized predictive error data, which is obtained by multiplying the quantized predictive error data generated by the quantizer by the quantized coefficient, and at least one piece of the predictive value data, which is generated with respect to pixel data close to pixel data of a predictive target and previously retained.

9. The coding device according to claim 4, wherein
the predictive value data generator temporarily and sequentially retains the sequentially-generated predictive value data, and generates new predictive value data by adding the recently-retained predictive value data to inversely-quantized predictive error data, which is obtained by multiplying the quantized predictive error data generated by the quantizer by the quantized coefficient.

10. The coding device according to claim 1, wherein,
when the coding controller finds that a situation in which the predictive error data becomes 0 is to be generated with a predetermined condition satisfied, the coding controller controls the coder such that the coder generates the variable-length coded data having a one-bit code length when the predictive error data is 0.

11. The coding device according to claim 1, wherein
the target code length is equal to or shorter than a length that is obtained by multiplying a code length of the pixel data by a target compression ratio.

12. A decoding device comprising:
a decoder that decodes the variable-length coded data, which is generated by the coding device according to claim 1, by performing set decoding processing, and sequentially generates decoded predictive error data;
a decoded predictive value data generator that sequentially generates decoded predictive value data, which is a predictive value of decoded pixel data;
a decoded pixel data generator that sequentially generates the decoded pixel data, which is a sum of the decoded predictive error data and the decoded predictive value data; and
a decoding controller that sequentially controls the decoder, wherein,
while the predetermined number of pieces of the decoded pixel data are generated,
the decoding controller sequentially calculates a decoding accumulated value by accumulating a difference between the code length of the variable-length coded data decoded by the decoder and the target code length used in the coding device,
the decoding controller estimates coding processing, which is performed to the variable-length coded data to be decoded by the decoder, based on the decoding accumulated value and the number of decoding times, which is the number of times of decoding performed by the decoder, and
the decoding controller sets the decoder such that decoding processing, which is an inverse processing of the estimated coding processing, is performed to the variable-length coded data.

13. The decoding device according to claim 12, wherein
the decoding controller sequentially recognizes the variable-length coded data by sequentially detecting a header portion, which constitutes a part or whole of the variable-length coded data, in continuously-input data.

14. The decoding device according to claim 12, wherein
the decoded predictive value data generator temporarily and sequentially retains the decoded pixel data sequentially generated by the decoded pixel data generator, and generates new decoded predictive value data using at least one piece of the decoded pixel data, which is close to the decoded pixel data of a predictive target and previously retained.

15. The decoding device according to claim 12, wherein
the decoded predictive value data generator temporarily and sequentially retains the decoded pixel data sequentially generated by the decoded pixel data generator, and generates the recently-retained decoded pixel data as new decoded predictive value data.

16. A coding/decoding system comprising:
a coding device;
a decoding device; and
a storage device having a predetermined storage capacity, wherein the coding device comprises:
predictive value data generator that sequentially generates predictive value data, which is a predictive value of pixel data;
a predictive error data generator that sequentially generates predictive error data, which is a difference between the pixel data and the predictive value data;
a coder that sequentially codes the predictive error data to sequentially generate variable-length coded data, in which a code length is variable and equal to or shorter than a set maximum code length; and
a coding controller that sequentially controls the coder, wherein,
while a predetermined number of pieces of the variable-length coded data are generated, the coding controller sequentially calculates an accumulated value by accumulating a difference between the code length of the variable-length coded data generated by the coder and a target code length,
the coding controller sequentially sets the maximum code length corresponding to a difference between a limit value of the accumulated value and the accumulated value, the limit value being determined according to the number of coding times, which is the number of times of coding performed by the coder, such that the accumulated value is equal to or lower than 0 at the time the predetermined number of pieces of variable-length coded data are generated, and
the limit value decreases in a continuous or stepwise manner as the number of coding times increases, and the limit value becomes 0 at least before the number of coding times reaches the predetermined number,
the decoding device comprises:
a decoder that decodes the variable-length coded data, which is generated by the coding device, by performing set decoding processing, and sequentially generates decoded predictive error data;
a decoded predictive value data generator that sequentially generates decoded predictive value data, which is a predictive value of decoded pixel data;
a decoded pixel data generator that sequentially generates the decoded pixel data, which is a sum of the decoded predictive error data and the decoded predictive value data; and
a decoding controller that sequentially controls the decoder, wherein,
while the predetermined number of pieces of the decoded pixel data are generated,
the decoding controller sequentially calculates a decoding accumulated value by accumulating a difference between the code length of the variable-length coded data decoded by the decoder and the target code length used in the coding device,
the decoding controller estimates coding processing, which is performed to the variable-length coded data to be decoded by the decoder, based on the decoding accumulated value and the number of decoding times, which is the number of times of decoding performed by the decoder, and
the decoding controller sets the decoder such that decoding processing, which is an inverse processing of the estimated coding processing, is performed to the variable-length coded data,
the variable-length coded data generated by the coding device is written in the storage device, and
the decoding device generates the decoded pixel data using the variable-length coded data read from the storage device.

17. A coding method comprising:
a predictive value data generating step of generating predictive value data, which is a predictive value of pixel data;
a predictive error data generating step of generating predictive error data, which is a difference between the pixel data and the predictive value data generated in the predictive value data generating step;
a coding step of coding the predictive error data, which is generated in the predictive error data generating step, to generate variable-length coded data, in which a code length is variable and equal to or shorter than a set maximum code length;

an accumulated value calculating step of calculating an accumulated value by accumulating a difference between the code length of the variable-length coded data generated in the coding step and a target code length; and a maximum code length setting step of setting the maximum code length in the next coding step to correspond to a difference between a limit value of based on the accumulated value calculated in the accumulated value calculating step and the accumulated value, the limit value being determined according to the number of coding times, which is the number of times of the performed coding step, wherein the predictive value data generating step, the predictive error data generating step, the coding step, the accumulated value calculating step, and the maximum code length setting step are repeatedly performed until a predetermined number of pieces of the variable-length coded data are generated, and the maximum code length is set in the maximum code length setting step such that the accumulated value is equal to or lower than 0 at the time the predetermined number of pieces of variable-length coded data are generated, and the limit value decreases in a continuous or stepwise manner as the number of coding times increases, and the limit value becomes 0 at least before the number of coding times reaches the predetermined number.

18. A decoding method comprising:

a decoding step of decoding the variable-length coded data, which is generated by the coding method according to claim 17, by performing set decoding processing, and generating decoded predictive error data;

a decoding accumulated value calculating step of calculating a decoding accumulated value by accumulating a difference between the code length of the variable-length coded data decoded in the decoding step and the target code length used in the coding method;

a decoding processing setting step of estimating coding processing, which is performed to the variable-length coded data to be decoded in the next decoding step, based on the decoding accumulated value calculated in the decoding accumulated value calculating step and the number of decoding times, which is the number of times of the performed decoding step, and setting decoding processing corresponding to an inverse transformation of the estimated coding processing as the decoding processing in the next decoding step;

a decoded predictive value data generating step of generating decoded predictive value data, which is a predictive value of decoded pixel data; and a decoded pixel data generating step of generating the decoded pixel data, which is a sum of the decoded predictive error data generated in the decoding step and the decoded predictive value data generated in the decoded predictive value data generating step, wherein the decoding step, the decoding accumulated value calculating step, the decoding processing setting step, the decoded predictive value data generating step, and the decoded pixel data generating step are repeatedly performed until the predetermined number of pieces of decoded pixel data are generated.

* * * * *